Nov. 3, 1942.                R. J. BAKER                2,300,824
              MEANS FOR SECURING MACHINE PARTS AGAINST
                   RELATIVE LATERAL DISPLACEMENT
                        Filed Sept. 29, 1941
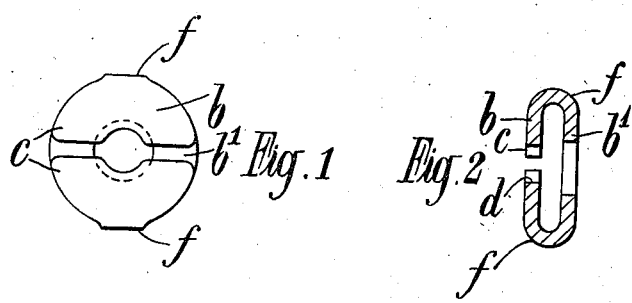
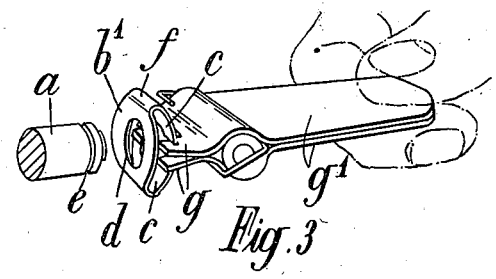
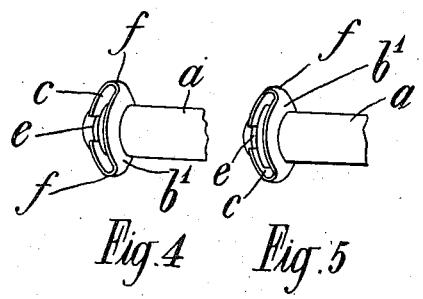
Inventor,
R. J. Baker
By: Glascock Downing &...

Patented Nov. 3, 1942

2,300,824

UNITED STATES PATENT OFFICE 2,300,824

MEANS FOR SECURING MACHINE PARTS AGAINST RELATIVE LATERAL DISPLACEMENT

Raymond Jack Baker, Twickenham, England, assignor to The Automotive Engineering Company Limited, Twickenham, England Application September 29, 1941, Serial No. 412,912
In Great Britain April 26, 1940

8 Claims. (Cl. 287—53)

This invention relates to means which can be employed in place of the known circlips for securing a machine part in position against lateral or substantially lateral displacement, such, for example, as the location of a pinion on a shaft.

The invention has for its object to provide an improved fitting of the above character which is readily applicable to work pieces of relatively very small dimensions to which the existing circlips are not suited.

According to the invention a device for the purpose described has the gripping surfaces provided upon a pair of co-planar spring jaws connected with a ring which is laterally spaced from the jaws so as to be disposed in a plane substantially parallel to the plane of the jaws.

The invention also consists in a device for the purpose described having gripping surfaces forming part of spring elements connected by a ring element which lies in a plane spaced from and preferably parallel to the plane of the gripping surfaces.

The invention also consists in a device for the purpose described comprising a ring element adapted to fit loosely over a spindle or shaft on which the device is to be secured and having extensions of spring-like character formed with gripping jaws to engage the spindle or shaft in a plane spaced axially from the plane of the ring.

The invention also consists in a device for securing machine parts against lateral or substantially lateral relative displacement, having the further features hereinafter described or indicated.

In the accompanying drawing:

Figure 1 is a view looking on the front face of the split ring or spring jaws of a device in accordance with the invention.

Figure 2 is a central vertical cross section of Figure 1,

Figure 3 shows the device of Figures 1 and 2 held upon a tool ready for assembly upon a spindle or rod, Figure 4 shows the device assembled, and Figure 5 is a view similar to Figure 4 but showing a washer interposed between the ring elements of the device whereby the latter is able to take up axial thrusts.

In carrying the invention into effect in one convenient manner as illustrated in the drawing, a device for securing a machine part such as a spindle or rod $a$ against lateral or substantially lateral movement with respect to another machine part comprises two substantially parallel and laterally spaced rings $b$, $b^1$ disposed opposite one another and of which the ring $b^1$ is plane, while the other ring $b$ is split along a diameter to provide a pair of co-planar spring jaws $c$. Each ring is provided with a central aperture $d$, the diameter of the aperture in the plane ring $b^1$ being such as will permit the spindle $a$ to be passed therethrough and the diameter of the aperture in the split ring $b$ being smaller and being such as to permit the spring jaws $c$ to be sprung into an annular groove $e$ in the spindle, the two rings being joined together at diametrically opposite points by transverse connecting webs $f$ and the whole being formed from a single piece of spring steel.

In Figure 3 there is illustrated a tool suitable for use in applying the device to the spindle or rod $a$ and which comprises a pair of jaws $g$, which are forced apart when the handle jaws $g^1$ are compressed by the operator and upon which the device can thus be held with the spring jaws $c$ thereof forced apart or deflected such that, while held upon the tool, the plane ring $b$ of the device can be passed over and along the spindle to position the spring jaws $c$ opposite the annular groove $e$ when the tool can be released from the device to enable these jaws to snap into the groove.

If desired, and as illustrated in Figure 5, the space between the two rings $b$, $b^1$ may include a washer $h$, in which case the device is able to withstand an axial thrust and is more positive in action than is the case of the device shown in Figure 4 where no washer is present.

Whereas the known circlips are in practice limited to diameters of $15/32''$ and over the device according to the present invention is capable of being applied to spindles and the like of smaller diameter of from $1/8''$ to $15/32''$ for example, it being appreciated that the device as shown in the drawing is of larger size compared therewith for ease of illustration.

I claim:

1. A device for the purpose referred to comprising as a single member a ring element adapted to fit loosely over a spindle or shaft on which the device is to be secured and having extensions of spring-like character each formed with a gripping jaw to engage the spindle or shaft in a plane spaced axially from the plane of the ring, and the distance between the jaws being less than the internal diameter of the ring element.

2. A device for the purpose referred to comprising in one piece an apertured base for loosely engaging a mechanical part and a plurality of spring extensions thereof bent over so as normally to lie substantially parallel to the base and with their free extremities spaced apart normally a distance less than the diameter of the aperture in the base to constitute gripping jaws.

3. A device for the purpose referred to comprising as a single member a ring element adapted to fit loosely over a spindle or shaft having a groove on which it is desired to secure the device, extensions from said ring element of spring-like character formed at their extremities with gripping jaws which are capable of being held apart when the device is being placed in position on the spindle or shaft and of springing into engagement with the groove in the spindle or shaft when, upon the jaws being brought opposite the groove, they are released to spring towards each other, and the distance between the edges of the jaws being less than the internal diameter of the ring element when the jaws are in a normal or released position.

4. A device for the purpose referred to comprising as a single member a collar member adapted to fit loosely over a mechanical part on which it is desired to secure the device and extensions from said collar member of spring-like character formed at their free extremities with gripping jaws which are capable of being held forced apart when the device is being placed in position on said mechanical part and of springing into gripping engagement with the mechanical part when, upon the device being placed in the correct position, the jaws are released to spring towards each other, and the distance between the edges of the jaws being less than the internal diameter of the collar member when the jaws are in a normal or released position.

5. A device for the purpose referred to comprising as a single member a collar member adapted to fit loosely over a mechanical part on which it is desired to secure the device and extensions from said collar member of spring-like character bent over so as to form co-planar gripping jaws disposed in a plane substantially parallel to the plane of the collar member and normally spaced apart at their outer extremities a distance less than the internal diameter of the collar member to grip the said mechanical part between them.

6. A device for the purpose referred to comprising two substantially parallel and laterally spaced collars disposed opposite one another, and transverse flexible webs joining the two collars together at opposite points, one said collar being formed as one member having an aperture by which this collar can be passed freely over a mechanical part to which it is desired to fit the device and the other collar being composed of a plurality of separate co-planar jaws each of which is connected to the other collar by one of said transverse webs and which jaws are spaced apart at their free extremities to define an opening co-axial with and normally less than the diameter of the aperture in the said other collar and in which the portion of the mechanical part gripped by these jaws can be accommodated.

7. A device for the purpose referred to comprising two parallel and laterally spaced rings disposed opposite one another and of which one ring is plane while the other ring is split along a diameter to provide a pair of co-planar spring jaws spaced apart at their free extremities to provide an opening therebetween co-axial with and normally of less diameter than the opening in the plane ring and a flexible web connecting each spring jaw with the plane ring.

8. A device for the purpose described comprising as a single member a base having an aperture therein which is somewhat larger than the mechanical part upon which it is desired to fit the device so that the said base can fit loosely over said part, extensions from said base in the form of spring arms and a jaw member on each said extension disposed so that the jaws are co-planar and lie in a plane laterally spaced from and substantially parallel with the plane of the base, the free extremities of said jaws being spaced apart to define in the normal condition of the jaws an opening which is somewhat smaller than the aperture in the base and is such that the jaws may have gripping relationship with the said mechanical part to secure the device thereon.

RAYMOND JACK BAKER.